United States Patent [19]

Jäger

[11] Patent Number: 4,578,461
[45] Date of Patent: Mar. 25, 1986

[54] TRIPHENDIOXAZINE DYESTUFFS

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 673,259

[22] Filed: Nov. 20, 1984

[30] Foreign Application Priority Data

Dec. 7, 1983 [DE] Fed. Rep. of Germany ....... 3344254

[51] Int. Cl.⁴ .................. C07D 498/04; C09B 19/00
[52] U.S. Cl. ........................................ 544/76; 8/657; 544/75; 544/77
[58] Field of Search ...................... 544/75, 76, 77

[56] References Cited

U.S. PATENT DOCUMENTS

| | | | |
|---|---|---|---|
| 3,996,221 | 12/1976 | Leng et al. | 544/75 X |
| 4,092,478 | 5/1978 | Plant et al. | 544/76 |
| 4,336,377 | 6/1982 | Adam et al. | 544/74 |
| 4,400,504 | 8/1983 | Harms et al. | 544/76 |
| 4,472,575 | 9/1984 | Renfrew | 544/76 |
| 4,512,773 | 4/1985 | Anderton et al. | 544/76 X |

FOREIGN PATENT DOCUMENTS 101665 2/1984 European Pat. Off. .

Primary Examiner—Richard L. Raymond
Attorney, Agent, or Firm—Sprung, Horn, Kramer & Woods

[57] ABSTRACT

Dyestuffs of the formula

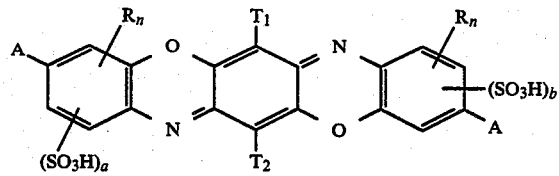

where the substituents are as defined in the descriptive part of the Application, are suitable for dyeing natural and synthetic fibre materials and produce dyeings having good fastness properties.

2 Claims, No Drawings

TRIPHENDIOXAZINE DYESTUFFS

The present invention relates to dyestuffs of the formula

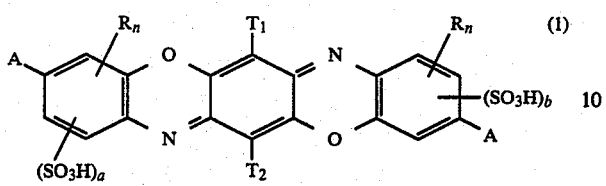

wherein
A=

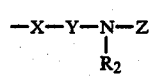

X=—O—, —S— or —NR$_1$—,
R$_1$=H, C$_1$-C$_4$-alkyl or, together with R$_2$, =alkylene,
Y=an aliphatic or araliphatic radical,
R$_2$=H, C$_1$-C$_4$-alkyl, aralkyl or aryl,
Z=a non-fibre-reactive radical of the formula —SO$_2$B or —CONHB wherein
B=alkyl, cycloalkyl, aralkyl or aryl,
T$_1$ and T$_2$=H, halogen, C$_1$-C$_4$-alkyl, C$_1$-C$_4$-alkoxy or aryl,
R=halogen, carboxyl, C$_1$-C$_4$-alkyl or C$_1$-C$_4$-alkoxy,
n=0 or 1,
a and b=0 or 1 such that a+b=1 or 2 and each of the sulpho groups is in the o-position relative to A,
and to their preparation and use for dyeing natural or synthetic fibre materials.

In preferred dyestuffs, T$_1$ and T$_2$=Cl, n=0 and X=NR$_1$, in particular X=—NH.

The alkyl, aryl, alkoxy, aralkyl, phenyl and naphthyl radicals can, if desired, be substituted by substituents customary in dyestuffs.

Suitable aryl radicals are in particular optionally substituted phenyl radicals or naphthyl radicals, possible substituents being in particular C$_1$-C$_4$-alkyl, C$_1$-C$_4$-alkoxy, chlorine, bromine, nitro, carbo-C$_1$-C$_4$-alkoxy, carboxyl or sulpho.

Suitable aralkyl radicals are in particular phenyl-C$_1$-C$_4$-alkyl radicals which can be optionally substituted by the abovementioned substituents.

An example of a suitable aliphatic radical is straight-chain or branched C$_2$-C$_6$-alkylene which, for example, can be interrupted by hetero atoms such as N, O or S or arylene radicals or CO groups or be substituted by substituents, for example OH, sulpho, carboxyl, optionally substituted phenyl or C$_1$-C$_4$-alkoxycarbonyl.

Examples of suitable araliphatic radicals are phenylalkylene radicals where the phenyl radicals can be substituted as indicated above and alkylene preferably stands for C$_1$-C$_4$-alkylene.

In particular C$_1$-C$_4$-alkyl which can be substituted, for example by OH, sulpho or C$_1$-C$_4$-alkoxy, is a suitable alkyl radical.

Examples of suitable radicals Y are 1,2-ethylene, 1,2- or 1,3-propylene, 2-oxy-1,3-propylene, 1- and 2-phenyl-1,3-propylene, 2-(4'-sulphophenyl)-1,3-propylene, 1,4-, 2,3- and 2,4-butylene, 2-methyl-1,3-propylene, 2-methyl-2,4-pentylene, 2,2-dimethyl-1,3-propylene, 1-phenylethylene, 1-chloro-2,3-propylene, 1,6- and 2,5-hexylene, 2,3-diphenyl-1,4-butylene, 1-methoxycarbonyl-1,5-pentylene, 1-carboxy-1,5-pentylene, 2,7-heptylene, 3-methyl-1,6-hexylene, —CH$_2$CH$_2$OCH$_2$CH$_2$—, —CH$_2$CH$_2$SCH$_2$CH$_2$—,

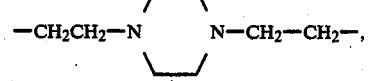

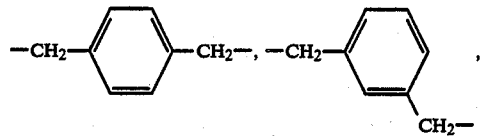

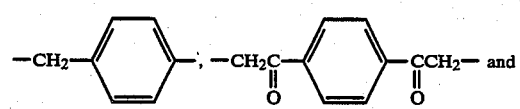

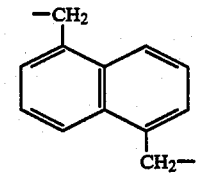

Y preferably stands for a straight-chain or branched aliphatic C$_2$-C$_6$-radical, in particular for —CH$_2$—CH$_2$—, —CH$_2$CH$_2$CH$_2$— or

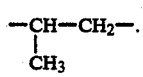

Examples of radicals R$_2$ are hydrogen methyl, ethyl, phenyl, 3- and 4-sulphophenyl, benzyl, sulphomethyl, β-hydroxyethyl, β-methoxyethyl and β-sulphatoethyl.

Suitable substituents B are in particular phenyl and naphthyl which each can be substituted, for example by methyl, ethyl, methoxy, ethoxy, chlorine, bromine, nitro, ethoxycarbonyl, carboxyl, methoxycarbonyl and sulpho, as well as C$_1$-C$_{10}$-alkyl radicals which can be substituted, for example by methoxy, chlorine, methoxycarbonyl or carboxyl.

Examples of suitable cycloalkyl radicals B are cyclohexyl radicals which can be substituted, for example by methyl or ethyl.

Suitable aralkyl radicals B are in particular benzyl radicals which can be substituted as indicated for the phenyl radicals B.

Examples of suitable radicals Z are —SO$_2$CH$_3$, —SO$_2$C$_2$H$_5$, —SO$_2$CH$_2$Cl, —SO$_2$(CH$_2$)$_4$Cl,

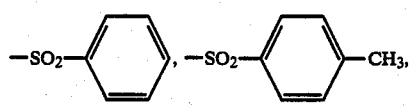

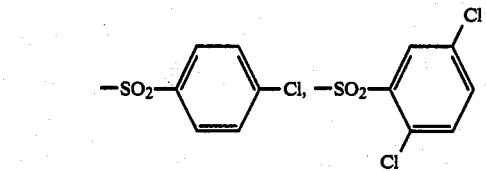

-continued

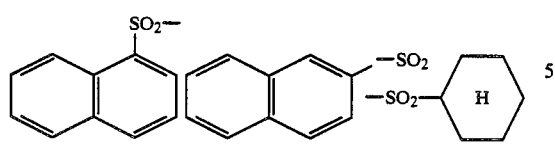

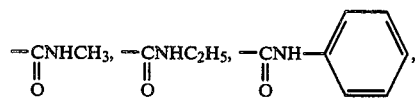

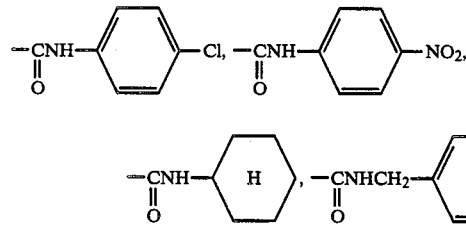

The invention also relates to a process for preparing the dyestuffs of the formula (1), which is characterised in that 1 mole of a dyestuff of the formula

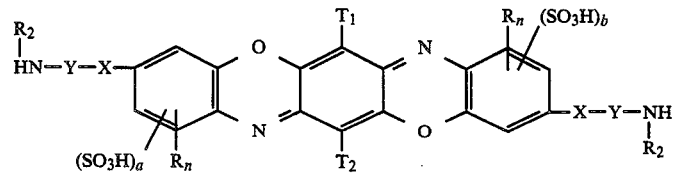  (2)

is condensed with 2 moles of an acyl component of the formula

ClSO$_2$B   (3)

by eliminating 2 moles of HCL or with 2 moles of an isocyanate of the formula

B—NCO   (4).

The condensation of dyestuff base (2) with acylating components (3) and (4) is generally carried out at temperatures between 0° and 60° C. and within the pH range from 3 to 12 in water. It is advisable to carry out the acylating reaction with (3) in the presence of an acid-binding agent, in order to keep the pH within the desired range.

Examples of sulphonyl chlorides of the formula (3) are CH$_3$SO$_2$Cl, C$_2$H$_5$SO$_2$Cl, Cl(CH$_2$)$_4$SO$_2$Cl,

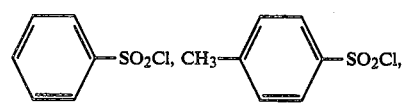

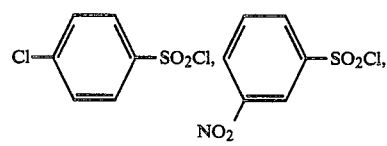

-continued

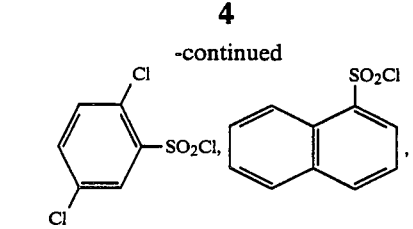

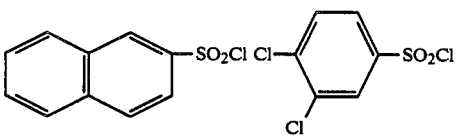

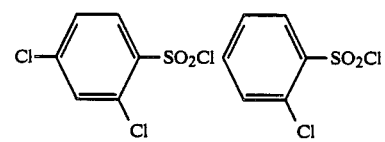

Examples of isocyanates of the formula (4) are CH$_3$NCO, C$_2$H$_5$NCO,

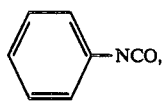

The dyestuff bases of the formula (2) are known. A possible method of preparation is given in British Pat. Nos. 1,559,752, 1,450,746 and 2,059,985.

The dyestuffs according to the invention are suitable for dyeing fibre materials to which the dyestuffs can be applied in the form of an aqueous solution by dyeing, padding or printing. Examples of textile materials which can be dyed are materials which contain natural cellulose fibres, such as, for example, paper, cotton, regenerated cellulose fibres, such as, for example, viscose rayon, natural protein fibres, such as, for example, wool and silk, and synthetic polyamide fibres, such as, for example nylon 66 and nylon 6. The dyestuffs are suitable in particular for dyeing synthetic polyamide textile materials, producing on them dyeings having a surprisingly high degree of fastness to wet treatments. The polyamides can be used in any convenient form, such as, for example, in the form of filaments, staple fibres, fabrics or films, and the application conditions can be the same as already known for applying water-soluble dyestuffs to synthetic polyamides.

The formulae shown are those of the corresponding free acids. The dyestuffs were generally isolated, and used for dyeing, in the form of the alkali metal salts, in particular the sodium salts.

The formulae shown apply in each case to one of the isomeric reaction products formed in the reaction.

The weights in the examples are based on the free acid. The numbers given in the examples to characterise the hue are the hue indicator numbers from the Colour Index hue indication chart.

EXAMPLE 1

63.1 g of the dyestuff base of the formula

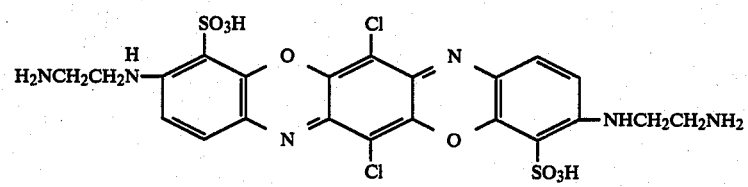

are suspended in 1 liter of water. 35.3 g of benzenesulphonyl chloride are added dropwise at 25° to 35+ while at the same time pH 8.5–9 is maintained by the simultaneous addition of dilute sodium hydroxide solution. The dyestuff goes into solution in the course of the acylation. After the condensation has ended the dyestuff is salted out, dried and ground. This produces a blue dyestuff powder which gives a clear blue solution in water. The dyestuff has the formula

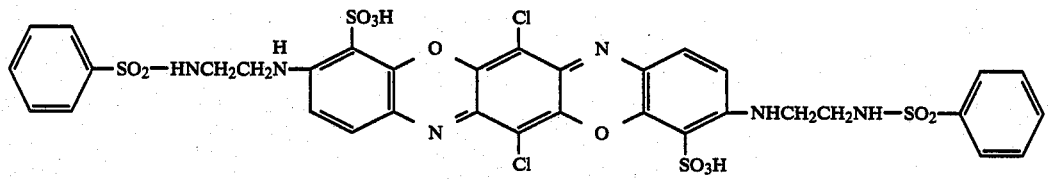

Brilliant blue dyeings (hue indicator number 13) are obtained by a dyeing method customary for nylons. If this example is repeated except that use is made of the sulphonyl chlorides of the following table and of the dyestuff bases of the following formula, this likewise produces useful blue dyestuffs.

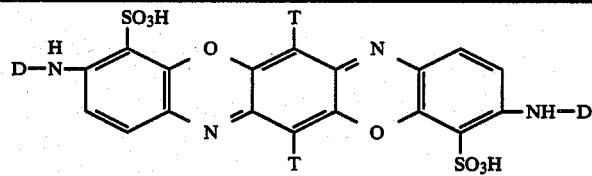

| Example | D | T | Sulphonyl chloride | Hue | Hue indicator number |
|---|---|---|---|---|---|
| 2 | CH$_2$CH$_2$NH$_2$ | Cl | ClSO$_2$—⟨benzene⟩—CH$_3$ | Blue | 13 |
| 3 | " | " | ClSO$_2$—⟨benzene⟩—Cl | " | " |
| 4 | " | Br | " | " | " |
| 5 | " | Cl | ClSO$_2$CH$_3$ | " | " |
| 6 | CH$_2$—CHNH$_2$<br>       CH$_3$ | Cl | ClSO$_2$—⟨benzene⟩ | " | " |
| 7 | CH$_2$—CHNH$_2$<br>       CH$_3$ | Cl | ⟨naphthalene⟩—SO$_2$Cl | " | " |

-continued

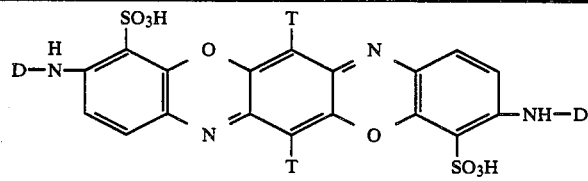

| Example | D | T | Sulphonyl chloride | Hue | Hue indicator number |
|---------|---|---|--------------------|-----|----------------------|
| 8 | CH2CH2NH2 | Cl | " | " | " |
| 9 | CH2CH2CH2NH2 | Cl | " | " | " |
| 10 | " | Cl | ClSO2—C6H5 | " | " |
| 11 | " |   | ClSO2—C6H4—CH3 | " | " |
| 12 | " |   | ClSO2CH3 | " | " |
| 13 | CH2CH2CH2NH—C6H5 |   | " | " | " |
| 14 | CH2CH2CH2NCH2—C6H4—Cl (H) |   | ClSO2CH3 | " | " |

EXAMPLE 15

63.1 g of the dyestuff of the formula

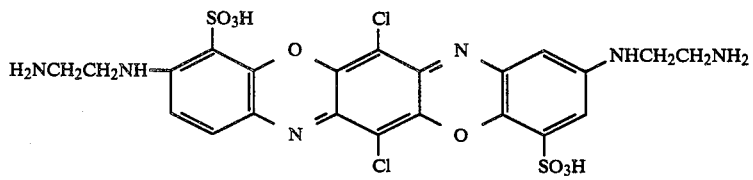

are suspended in 1.5 liters of water and are dissolved by means of 13–14 ml of concentrated sodium hydroxide solution (d=1.5). The alkaline solution is cooled down to 5° to 10°, and 24 g of phenyl isocyanate are added dropwise. After the condensation has ended, the dyestuff is salted out, filtered off with suction, dried and ground. This leaves a blue dyestuff powder which gives a clear blue solution in water. The dyestuff has the formula Dyeing by means of a method customary for nylon dyestuffs produces bright blue dyeings (hue indicator number 13). If this example is repeated by reacting the isocyanate of the following table with the corresponding dyestuff bases of the formula

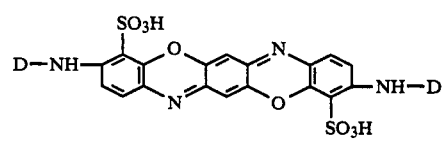

this produces further useful dyestuffs.

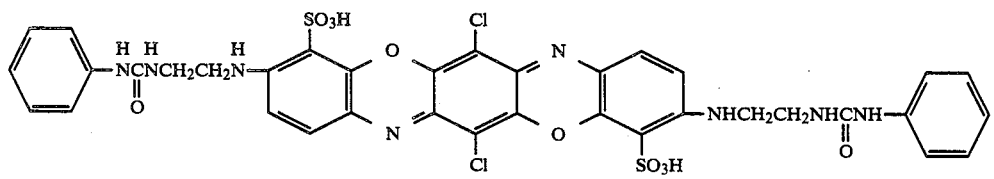

| Example | D | T | Isocyanate | Hue | Hue indicator number |
|---|---|---|---|---|---|
| 16 | CH₂CH₂NH₂ | Cl | Cl-C₆H₄-NCO (4-chlorophenyl isocyanate) | Blue | 13 |
| 17 | " | " | CH₃-C₆H₄-NCO (4-methylphenyl isocyanate) | " | " |
| 18 | " | " | Cl-C₆H₄-NCO | "" | |
| 19 | " | " | o-CH₃-C₆H₄-NCO | " | " |
| 20 | " | " | cyclohexyl-NCO | " | " |
| 21 | " | " | CH₃NCO | " | " |
| 22 | " | " | C₂H₅NCO | " | " |
| 23 | CH₂CH₂CH₂NH-C₆H₅ | " | CH₃NCO | " | " |
|  |  |  | C₂H₅NCO | " | " |
| 24 | " | " | C₆H₅-NCO | " | " |
| 25 | CH₂CH₂CH₂NH₂ | CH₃ | " | " | " |
| 26 | " | OCH₃ | " | " | " |

I claim:
1. Dyestuffs of the formula

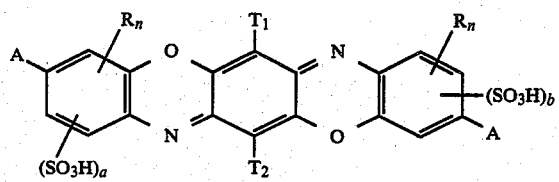

wherein
A=

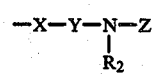

$X = -O-, -S-$ or $-NR_1-$,
$R_1 = H$, $C_1-C_4$-alkyl or, together with $R_2$, =alkylene,
$Y = C_2-C_6$-alkylene which can be interrupted by N, O, S or CO and can be substituted by OH, sulpho or carboxyl,
$R_2 = H$, $C_1-C_4$-alkyl, aralkyl or aryl,
Z = a non-fibre-reactive radical of the formula $-SO_2B$ or $-CONHB$ wherein
B = alkyl, cycloalkyl, aralkyl or aryl,
$T_1$ and $T_2 = H$, halogen, $C_1-C_4$-alkyl, $C_1-C_4$-alkoxy or aryl,
R = halogen, carboxyl, $C_1-C_4$-alkyl or $C_1-C_4$-alkoxy,
n = 0 or 1,
a and b = 0 or 1 such that a+b=1 or 2 and each of the sulpho groups is in the o-position relative to A.

2. Dyestuffs of claim 1 where $T_1$ and $T_2 = Cl$, n=0 and $X = -NH$.

* * * * *